(12) United States Patent
Herzog et al.

(10) Patent No.: US 12,240,759 B2
(45) Date of Patent: Mar. 4, 2025

(54) METHOD AND DEVICE FOR SEPARATING A GAS MIXTURE CONTAINING DIBORANE AND HYDROGEN

(71) Applicant: MESSER SE & CO. KGAA, Bad Soden (DE)

(72) Inventors: Friedhelm Herzog, Krefeld (DE); Joachim Barbe, Tonisvorst (DE)

(73) Assignee: Messer SE & Co. KGaA, Bad Soden (DE)

( * ) Notice: Subject to any disclaimer, the term of this patent is extended or adjusted under 35 U.S.C. 154(b) by 431 days.

(21) Appl. No.: 17/434,929

(22) PCT Filed: Feb. 13, 2020

(86) PCT No.: PCT/EP2020/053702
§ 371 (c)(1),
(2) Date: Aug. 30, 2021

(87) PCT Pub. No.: WO2020/177998
PCT Pub. Date: Sep. 10, 2020

(65) Prior Publication Data
US 2022/0144633 A1 May 12, 2022

(30) Foreign Application Priority Data
Mar. 2, 2019 (DE) .................. 10 2019 001 497.9

(51) Int. Cl.
*C01B 3/50* (2006.01)
*C01B 6/10* (2006.01)
*F25J 3/02* (2006.01)

(52) U.S. Cl.
CPC ............... *C01B 3/506* (2013.01); *C01B 6/10* (2013.01); *F25J 3/0223* (2013.01); *F25J 3/0252* (2013.01)

(58) Field of Classification Search
CPC . C01B 3/506; C01B 3/10; F25J 3/0252; F25J 3/0223
See application file for complete search history.

(56) References Cited

U.S. PATENT DOCUMENTS

| 2,070,099 A | * | 2/1937 | Twomey ................ C01B 3/506 |
| | | | 95/143 |
| 2013/0180265 A1 | * | 7/2013 | Lee ...................... B60H 1/3202 |
| | | | 62/50.1 |
| 2017/0191621 A1 | * | 7/2017 | Caristan .................... F17C 7/04 |

FOREIGN PATENT DOCUMENTS

| CN | 102119050 B | * | 8/2015 | ............ B01D 53/14 |
| DE | 1094248 B | | 12/1960 | |
| | (Continued) | | | |

OTHER PUBLICATIONS

International Search Report issued in corresponding PCT Application No. PCT/EP2020/053702, mailed Jun. 8, 2020.

(Continued)

*Primary Examiner* — Devon Russell
(74) *Attorney, Agent, or Firm* — Andrus Intellectual Property Law, LLP

(57) ABSTRACT

In order to separate diborane from a gas mixture containing diborane and hydrogen, the gas mixture is normally cooled in a storage tank using liquid nitrogen, wherein the diborane freezes out. In order to enable an extensively continuous separation of the diborane from the gas mixture, according to the invention, the gas mixture is brought into thermal contact with a liquefied gas in a heat exchanger, which liquefied gas is held at a pressure such that the diborane is liquefied by the thermal contact with the coolant, and the liquefied diborane is then discharged from the first heat exchanger and supplied to a storage tank. In a downstream, (Continued)

second heat exchanger, the diborane remaining in the gas mixture can then be caused to freeze out.

11 Claims, 1 Drawing Sheet

(56) References Cited

FOREIGN PATENT DOCUMENTS

| | | | | |
|---|---|---|---|---|
| DE | 3637892 A1 | * | 5/1988 | |
| DE | 19517273 C1 | | 2/1997 | |
| EP | 742040 A1 | * | 11/1996 | ........... B01D 5/0036 |
| EP | 1602401 A1 | | 12/2005 | |
| FR | 2572304 A1 | * | 5/1986 | |
| KR | 20170114146 A | | 10/2017 | |
| WO | WO-2023194967 A1 | * | 10/2023 | ........... B01D 53/002 |

OTHER PUBLICATIONS

Written Opinion issued in corresponding PCT Application No. PCT/EP2020/053702, mailed Jun. 8, 2020.

* cited by examiner

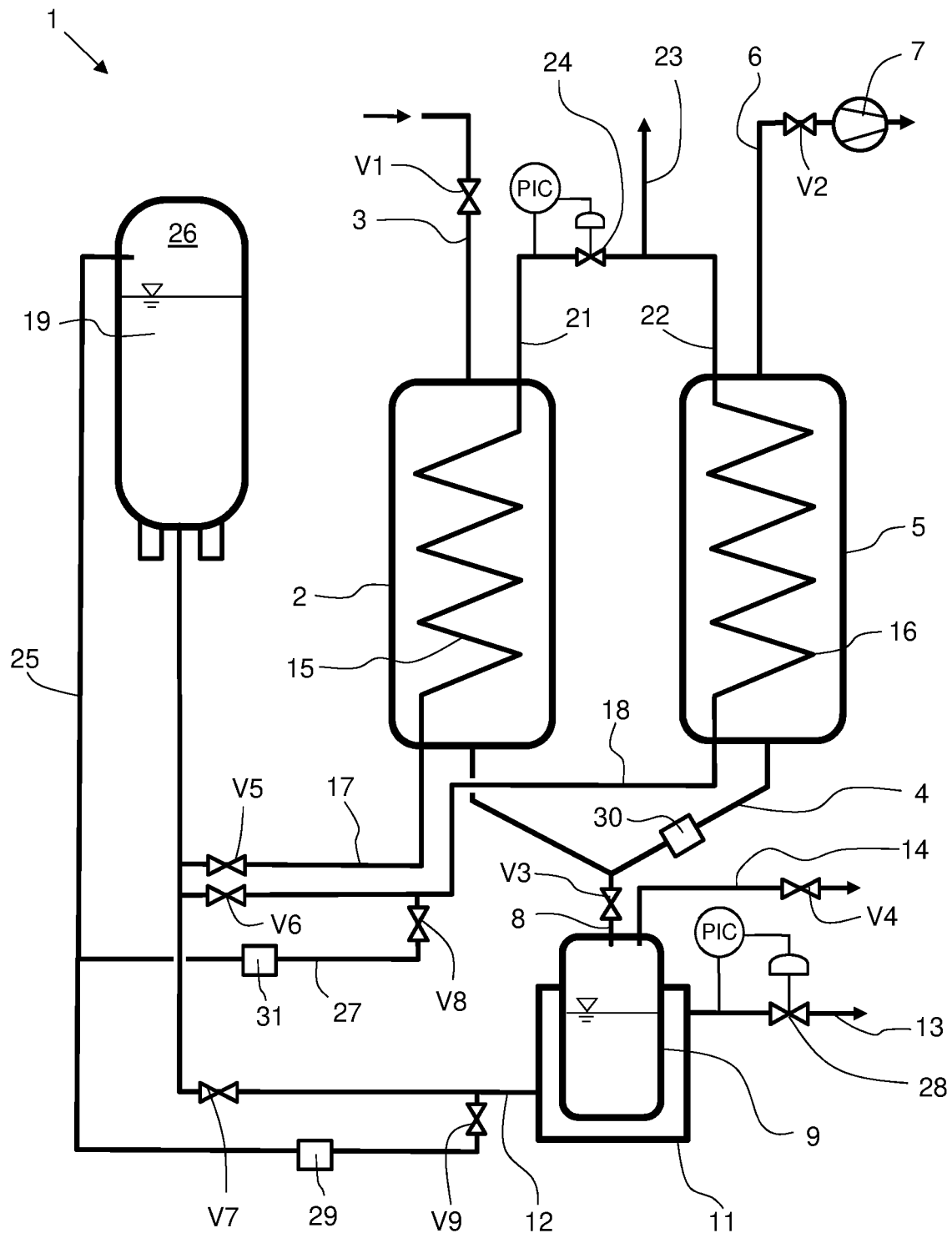

METHOD AND DEVICE FOR SEPARATING A GAS MIXTURE CONTAINING DIBORANE AND HYDROGEN

CROSS-REFERENCE TO RELATED APPLICATIONS

This application is the U.S. national stage application of International Application No. PCT/EP2020/053702, filed Feb. 13, 2020, which International Application was published on Sep. 10, 2020, as International Publication WO 2020/177998 in the German language. The International Application claims priority to German Application No. 10 2019 001 497.9, filed Mar. 2, 2019. The International Application and German Application are hereby incorporated herein by reference, in their entireties.

FIELD

The invention relates to a method for the separation of diborane from a diborane-hydrogen mixture, in which a gas mixture comprising diborane and hydrogen is supplied to a first heat exchanger in which the gas mixture comes into thermal contact with a first coolant, where the diborane at least to some extent condenses on heat-exchanger areas of the first heat exchanger. The invention further relates to a corresponding device.

BACKGROUND

The separation of a gas mixture consisting of diborane and hydrogen is by way of example required as process step in some processes for synthesis of diborane. One possibility for the production of diborane provides, for example, the acidolysis of sodium borohydride with methanesulfonic acid. The synthesis here is achieved in accordance with the following chemical reaction:

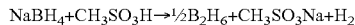

$NaBH_4 + CH_3SO_3H \rightarrow \frac{1}{2}B_2H_6 + CH_3SO_3Na + H_2$

The sodium borohydride is added in finely granulated form into concentrated methanesulfonic acid. The reaction proceeds spontaneously, whereupon a gas mixture of diborane and hydrogen is produced in a ratio of 1:2 parts by volume.

The subsequent separation of diborane and hydrogen is usually achieved in a batch process in stainless steel vessels retained in a bath of liquid nitrogen with a temperature of 196° C. The diborane freezes in the cold atmosphere that develops within the vessel. The hydrogen, which remains gaseous, is then drawn off from the vessel by means of a vacuum pump. The vessel is then heated to a temperature above the boiling point of diborane, and the diborane is recondensed in smaller vessels which again are cooled by liquid nitrogen. Until the diborane is subsequently used, it is kept in these vessels in cooling equipment at a temperature of about 20° C., in order to inhibit decomposition and the attendant undesired formation of higher boranes.

A method for the separation of hydrogen from a gas mixture comprising diborane and hydrogen via cooling of a storage container to 196° C. is mentioned by way of example in DE 1 094 248 B.

However, the known method has the disadvantage that batchwise operation is the only possibility, therefore requiring considerable amounts of time and money.

SUMMARY

The invention is therefore based on the object of providing a method which overcomes the disadvantages of the prior art and which can be operated continuously or almost continuously for the separation of a gas mixture consisting of diborane and hydrogen, and also providing a corresponding device.

Said object is achieved via a method with the features of claim 1 and via a device with the features of claim 6.

Advantageous embodiments of the invention are stated in the dependent claims.

DETAILED DESCRIPTION

According to the invention, in the first heat exchanger (hereinafter also termed "condenser") the gas mixture comprising diborane and hydrogen comes into indirect thermal contact with a liquefied gas which is maintained at a pressure such that the diborane is liquefied via the thermal contact with the coolant, without freezing. The liquefied diborane is then discharged from the first heat exchanger and supplied to a storage container. The temperature of the liquefied gas at the heat-exchanger areas of the first heat exchanger is therefore maintained at a value at which the diborane on the one hand does not freeze on the heat-exchanger areas to give frozen material and which on the other hand is below the dew point of the diborane present in the first heat exchanger, where the value for the dew point in turn depends on the respective pressure in the first heat exchanger.

It should additionally be stated that for the conduct of the method of the invention there is in no way any restriction of the origin of the gas mixture comprising diborane and hydrogen to the acidolysis of sodium borohydride with methanesulfonic acid mentioned in the introduction. Instead, the method of the invention can be used in any of the processes involving the task of separating a gas mixture comprising diborane and hydrogen. Insofar as further substances are present in the original mixture alongside diborane and hydrogen, further separation stages are sometimes required for separation of these substances before and/or after implementation of the method described herein.

The liquefied gas used as coolant in the first heat exchanger is preferably liquid nitrogen. Liquid nitrogen has a boiling point of about 77 K at a pressure of 1 bar. However, at a pressure above 13 bar the boiling point of liquid nitrogen is higher than the value of the freezing point of diborane (108.3 K). If, therefore, liquid nitrogen at a pressure above 13 bar is used in the first heat exchanger, the diborane condenses in the liquid state. The liquid diborane is discharged, for example, by way of a discharge line which starts from a lower region of the condenser, and flows into a storage container in which it is temporarily stored before dispensing or subsequent use.

A particularly advantageous embodiment of the invention provides here that the remaining gas mixture of diborane and hydrogen after passage through the first heat exchanger is supplied to a second heat exchanger (hereinafter also termed "freezer") in which the remaining gas mixture is introduced to a second coolant, which is controlled to a temperature such that diborane still present in the gas mixture freezes at heat-exchanger areas of the second heat exchanger. Most of the diborane present in the original gas mixture, for example 95% or more, is already removed by condensation in the first heat exchanger. In the second heat exchanger the gas mixture is cooled to an even greater extent, to a temperature below the freezing point of diborane, and consequently most of the diborane still present freezes out of the gas mixture at the heat-exchanger areas of the second heat exchanger. Because only a small residual quantity of diborane is still present in the gas mixture on entry into the second heat exchanger, the resultant frozen layer grows only slowly, and requires thawing of the heat-exchanger areas only at relatively long intervals.

In order to achieve completely continuous operation, it is additionally conceivable according to the invention that a further freezer is provided which can be connected to the condenser and is operated in alternation with the first freezer, while the respective other freezer is thawed. In an alternative system for possibly ensuring continuous operation, the (single) freezer is briefly warmed while operation continues, either by using heating equipment to warm the gas mixture flowing into the freezer or by bringing the heat-exchanger area of the freezer into contact with, instead of the coolant, a medium whose temperature is suitable for the defrosting of the heat-exchanger area, for example gaseous nitrogen controlled to a suitable temperature. The diborane in the second heat exchanger thus melts and flows in the direction of the storage container. In this embodiment, however, it is necessary to accept a higher level of diborane emission while the cooling of the freezer is interrupted.

A liquefied gas is likewise used as coolant in the second heat exchanger, this gas being in particular taken from the same source as the coolant used in the first heat exchanger. In particular, this is liquid nitrogen. However, in the second heat exchanger this is maintained at a lower pressure than in the first heat exchanger, and is therefore at a correspondingly lower temperature, specifically at a temperature below the freezing point of the diborane in the second heat exchanger. Even if different coolants are used in the two heat exchangers, the coolant in the second heat exchanger must be present at a temperature sufficiently low to freeze diborane from the gas mixture on the heat-exchanger areas in the second heat exchanger In order to prevent reverse flow of gaseous diborane into the first or second heat exchanger, the diborane in the storage container is also preferably maintained at a temperature at which it condenses; it is particularly preferably maintained at a temperature at which it remains in the liquid state. This is achieved by way of example in that the liquid diborane in the storage container is brought into thermal contact with a coolant whose temperature is above the freezing point, but below the boiling point, of the diborane in the storage container. By way of example, a liquefied gas is likewise used for this purpose, in particular the same liquefied gas as used in the first and/or the second heat exchanger, in particular liquid nitrogen, which is maintained at an appropriate pressure for the temperature-control of the diborane in a manner such that the temperature is sufficient to maintain the diborane in the liquid state.

In another advantageous embodiment of the method of the invention, the gas mixture is heated after passage through the first heat exchanger and before entry into the second heat exchanger. The heating here is carried out at a temperature value that is above the dew point temperature of the diborane-hydrogen mixture at the exit of the first heat exchanger. Diborane aerosols which have formed in the first heat exchanger are thus vaporized. The vaporized diborane then recondenses in the second heat exchanger, and precipitates in solid form on heat-exchanger areas thereof. The proportion of diborane in the gas mixture discharged from the second heat exchanger is thus still further reduced.

The object of the invention is also achieved with a device for the separation of diborane from a diborane-hydrogen mixture, said device being equipped with a first heat exchanger which has a supply line and a discharge line for a gas mixture comprising diborane and hydrogen, and which also has a coolant supply line for a liquefied gas used as coolant, and a gas discharge line for the discharge of coolant vaporized during thermal contact with the gas mixture at heat-exchanger areas of the first heat exchanger, and being characterized in that the first heat exchanger is equipped with a discharge line which is intended for diborane liquefied during heat exchange with the coolant and which is flow-connected to a storage container for the storage of the liquefied diborane, and the gas discharge line of the first heat exchanger is operationally connected to equipment for maintaining a prescribed pressure of the liquid coolant.

Diborane present in the supplied gas mixture condenses on the heat-exchanger areas in the first heat exchanger as a result of indirect heat exchange with the coolant, to give liquid diborane. In order to ensure that the heat-exchanger area of the first heat exchanger has the temperature required for that purpose, the liquefied gas functioning as coolant, for example liquid nitrogen, is brought to an appropriate temperature by adjustment of its pressure. Appropriate regulation and control equipment is advantageously provided here, and adjusts the pressure of the coolant in a manner such that the diborane condenses in the first heat exchanger to give liquid diborane, but does not freeze. After the cooling procedure, the residual gas mixture, mainly composed of hydrogen, is discharged from the first heat exchanger and can be supplied to a further purification stage or to another use. The discharge line serving for the outflow of the liquid diborane from the first heat exchanger here is directed geodetically downward, allowing gravitationally induced outflow of the diborane. By way of example, it branches off from the gas-mixture discharge line, which for this purpose likewise, at least in a section between condenser and branching-off of the liquid-diborane discharge line, runs geodetically downward.

An advantageous embodiment of the device of the invention provides a second heat exchanger, which has a supply line and a discharge line for a gas mixture consisting of diborane and hydrogen, and which also has a coolant supply line for a liquefied gas used as coolant and a gas discharge line for the discharge, from the second heat exchanger, of coolant vaporized during thermal contact with the gas mixture at heat-exchanger areas of the second heat exchanger, where the discharge line for the gas mixture of the first heat exchanger is flow-connected to the supply line for the gas mixture of the second heat exchanger. In this embodiment, after the gas mixture leaves the first heat exchanger it flows into the second heat exchanger and there, in indirect thermal contact with a coolant at the heat-exchanger areas, is cooled to an extent such that diborane still present in the gas mixture freezes at the heat-exchanger areas. Realization of a temperature in the second heat exchanger that is lower than in the first heat exchanger, with use of the same liquefied gas as coolant, is made possible by equipping the coolant supply line of the second heat exchanger with a pressure-reducer which can reduce the pressure of the liquefied gas from the storage pressure in the standing tank, for example 14 bar, to a lower pressure (for example 1 2 bar). The first heat exchanger and/or the second heat exchanger is/are additionally preferably configured as tube heat exchanger(s).

The second heat exchanger likewise has a liquid-diborane discharge line, which is used when the second heat exchanger is thawed. This discharge line can be configured as separate discharge line, but it is also possible that parts of a gas-mixture supply line leading from below into the second heat exchanger are used as discharge line for the condensate; in this case, a discharge line flow-connected to the storage container branches off at a suitable point from said line.

It is preferable that the coolant supply line of the first heat exchanger and the coolant supply line of the second heat exchanger are flow-connected to a source for a liquefied pressurized gas. Both coolants therefore preferably derive from the same source, which by way of example is a standing tank in which the nitrogen is stored in liquid form at a pressure sufficiently high that the temperature of the nitrogen is higher than the freezing point of diborane, i.e. by way of example at a pressure of 14 20 bar.

A likewise preferred embodiment of the invention provides that preferably electrical heating equipment is arranged in the supply line for the gas mixture of the second heat exchanger. Said equipment serves in particular for the above-described vaporization of diborane aerosols which have formed in the first heat exchanger, and can likewise be used for brief warming of the gas mixture supplied to the second heat exchanger in order to melt frozen diborane present in the second heat exchanger.

The storage container is also advantageously equipped with cooling equipment in order to store the diborane in the storage container in condensed, i.e. liquid or solid, form. By way of example, to this end the storage container is retained in a bath of liquefied gas, for example liquid nitrogen. The bath is preferably supplied from the same coolant source as the first and/or the second heat exchanger, and is equipped with equipment for the maintenance of a prescribed pressure which permits establishment of a prescribed temperature of the liquefied gas in the bath.

The storage container is moreover preferably equipped with a separate dispensing line, and is operationally connected to heating equipment. The heating equipment is by way of example electrical heating equipment or a heat exchanger by means of which a warmer gas, for example air or gaseous nitrogen, the temperature of which is above the boiling point of diborane, can be brought into thermal contact with the condensed diborane in the storage container. For the removal of diborane, the discharge line from the first heat exchanger is briefly blocked by means of a valve, and the diborane in the storage container is heated and thus vaporizes and can be discharged by way of the dispensing line. During this procedure there is no requirement for interruption of gas separation in the first and/or second heat exchanger.

In alternative possibilities, the dispensing line is also configured as immersed tube, or the dispensing line leads from the bottom of the storage container. In this case, it is only necessary that a small proportion of diborane in the storage container vaporizes for the purpose of pressure increase, and at least the major proportion of the diborane flows in liquid form out of the storage container. It is naturally also possible to use a liquid pump for this purpose. As soon as a prescribed quantity of liquid diborane has been removed in this way, the dispensing line is closed. The diborane removed in liquid form from the storage container in this embodiment can then be passed onward for dispensing in liquid form—or in gaseous form after vaporization.

An equally advantageous embodiment of the invention provides that the gas-mixture discharge line is equipped with a fluid-jet pump which is flow-connected on the injection side to the gas discharge line of the first heat exchanger. In this embodiment, therefore, the increased pressure of the gas which is flowing out of the first heat exchanger and which has been used there as coolant is further used to generate, in the discharge line for the gas mixture of the first heat exchanger or of the second heat exchanger, a reduced pressure by means of which the gas mixture is extracted from the respective heat exchanger. Alternatively, it is also possible that another pressurized gas is used for this purpose, an example being vaporized coolant from the headspace of a coolant storage container, for example of a standing tank for liquid nitrogen.

The method of the invention and the device of the invention are suitable for the separation of diborane-hydrogen gas mixtures in any desired mixing ratio. However, the invention is particularly effective in the case of high proportions of diborane, for example more than 30% by volume, in the gas mixture otherwise consisting mainly of hydrogen.

An implementation example of the invention will be explained in some detail with reference to the drawing. The single drawing (FIG. 1) shows the circuit diagram of a device of the invention.

The device 1 shown in FIG. 1 for the separation of diborane from a gas mixture comprising diborane and hydrogen comprises a first heat exchanger, hereinafter termed condenser 2, which has a supply line 3 for the gas mixture. A transfer line 4 leads from the bottom of the condenser 2 to a second heat exchanger, here termed freezer 5. A gas discharge line 6, in which a suction pump 7 is arranged, leads from the headspace of said freezer. Condenser 2, freezer 5 and transfer line 4 are equipped with thermally insulating walls.

At a geodetically lowest point of the transfer line 4, a liquid discharge line 8 branches off and leads into a storage container 9. The storage container 9, equipped with thermally conductive walls at least in its lower section, is retained within a container 11 which is intended for a coolant bath. The container 11 is configured to be pressure-resistant and closed, and has thermally insulated external walls. Connected to the container 11 are a coolant supply line 12 and a coolant discharge line 13. In the example shown here moreover a dispensing line 14 leads from the headspace of the storage container 9 to a dispensing system, not shown here, in which by way of example diborane can be dispensed into mobile containers.

Condenser 2 and freezer 5 are configured as indirect heat exchangers and equipped with heat-exchanger areas 15, 16 which respectively by way of example are tubes running parallel to one another or are a cooling coil with thermally conductive walls, this/these being intended for the passage of a liquid or gaseous coolant. The heat-exchanger areas 15, 16 are respectively connected at their ingoing ends to a coolant supply line 17, 18, these having flow-connection to a coolant source, in the implementation example to a nitrogen tank 19. At their outgoing ends, the heat-exchanger areas 15, 16 respectively lead into gas discharge lines 21, 22, which are brought together at a gas outlet 23 which serves both. It is self-evident that for the purposes of the invention it is in no way essential that the gas discharge lines 21, 22 are brought together; it is also possible, instead, to provide separate gas outlets. Arranged in the gas discharge line 21 that is connected to the heat-exchanger area 15 of the condenser 2 there is a pressure-maintaining valve 24, which maintains the pressure in the gas discharge line 21 at a prescribed or electronically communicated pressure value.

The coolant supply line 12 leading into the container 11 is moreover connected by way of a gas line 25 to the headspace 26 of the nitrogen tank 19. Equally, the coolant supply line 18 leading to the heat-exchanger area 16 of the freezer 5 is also connected to the headspace 26 by way of a gas line 27 which leads into the gas line 25. Arranged in the gas line 25 downstream of the branch-off point of the gas line 27 there is heating equipment 29 for the heating of the gaseous nitrogen in the gas line 25. The coolant discharge line 13 is also equipped with a pressure-maintaining valve 28; this maintains the pressure in the container 11 at a prescribed or electronically communicated pressure value.

Various valves are used for the control of the device 1. These are a valve V1 in the supply line 3, a valve V2 in the gas discharge line 6, a valve V3 in the liquid discharge line 8, a valve V4 in the dispensing line 14, a valve V5 in the coolant supply line 17, a valve V6, designed as pressure-reducer, in the coolant supply line 18, a valve V7 in the coolant supply line 12, a valve V9 in the gas line 25, downstream of the branch-off point of the gas line 27, and a valve V8 in the gas line 27. All valves V1-V9 are configured as remotely controllable valves and can be remotely controlled from a control station not shown here.

During the operation of the device 1, a gas mixture comprising diborane and hydrogen in a desired mixing ratio, for example in a ratio by volume of diborane to hydrogen of 1:2, is first passed by way of the supply line 3 through the condenser 2, the transfer line 4, the freezer 5 and the gas discharge line 6. To this end, the valves V1, V2 and V3 are open. The valves V5, V6 and V7 are moreover open. The valves V4, V8 and V9 are closed. Liquid nitrogen therefore flows from the nitrogen tank 19 through the heat-exchanger areas 15, 16, and there comes into thermal contact with the gas mixture present in the heat exchangers 2, 5. The valve V6, configured as pressure-reducing valve, ensures here that the liquid nitrogen in the heat-exchanger area 16 of the freezer 5, said area being connected by way of the gas outlet 23 to the surrounding atmosphere or to a nitrogen-return line, is at a low pressure of, for example, 1 to 2 bar. In contrast to this, the pressure-maintaining valve 24 in the gas discharge line 21 ensures that a higher pressure of more than 13 bar is maintained in the heat-exchanger area 15 of the condenser 2. The maximal level of the pressure value prescribed via the pressure-maintaining valve 24 in the implementation example according to FIG. 1 is determined by the operating pressure in the nitrogen tank 19, which by way of example is 14 bar.

Because of the different pressure conditions in the heat-exchanger areas 15, 16, the liquid nitrogen in the heat-exchanger area 15 of the condenser 2 is at a higher temperature than the liquid nitrogen in the heat-exchanger area 16 of the freezer 5. In the heat-exchanger area 15, the nitrogen is at a temperature which is higher than the freezing point of the diborane in the condenser, i.e. at a temperature above 108.3 K. Accordingly, most of the diborane present in the gas mixture supplied to the condenser 2, for example 95-99% thereof, condenses in the liquid state at the heat-exchanger area 15 and flows, while still liquid, by way of the connecting line 4 and the liquid discharge line 8 into the storage container 9.

The gas mixture, still comprising a residual quantity of diborane, flows out of the condenser 2 by way of the transfer line 4 into the freezer 5. The liquid nitrogen in the heat-exchanger area 16 of the freezer 5 is at a lower pressure than the liquid nitrogen in the heat-exchanger area 16, and has a temperature of, for example, 77 K. The temperature at the heat-exchanger area 16 is therefore below the freezing point of diborane. The diborane still present in the gas mixture therefore freezes at the surface of the heat-exchanger area 16, and there forms a frozen layer, which however grows only slowly because of the small quantity of diborane still present in the gas mixture. The gas mixture drawn out of the freezer 5 by way of the gas discharge line 6 by means of the suction pump 7 consists mainly of gaseous hydrogen, which then, in a manner not shown here, is collected and supplied to a further use, or discharged.

When the method is conducted as shown here, it is not impossible that a small portion of the diborane condenses in the condenser 2 to give an aerosol, which is therefore entrained by the flow of the gas mixture and escapes by way of the gas discharge line 6. In order to prevent this and to permit additional collection of this proportion of diborane, at least to a substantial extent, an optional embodiment of the invention provides that heating equipment 30, which by way of example is electrical, is provided in the transfer line 4, downstream of the branch-off point of the liquid discharge line 8. By means of the heating equipment 30, the gas mixture in the transfer line 4 is heated slightly to a temperature above the dew-point temperature of the diborane/H2 mixture at the outlet of the condenser 2, thus vaporizing the aerosols present therein. The diborane from the aerosols then condenses in the freezer 5, and at least a large part thereof precipitates in frozen form on the heat-exchanger area 16.

The diborane present in the storage container 9 is cooled by a coolant bath present in the container 11, and is thus retained in the liquid state. The coolant bath consists of liquid nitrogen, which flows from the nitrogen tank 19 by way of the coolant supply line 12 into the container 11. The liquid nitrogen vaporizes after heat-exchange with the storage container 9, and escapes by way of the coolant discharge line 13, where it is maintained at a pressure of more than 13 bar by the pressure-maintaining valve 28 arranged in the coolant discharge line 13. The liquid nitrogen in the container 11 is therefore at a temperature that is above the freezing point of diborane, i.e. by way of example at 108.5 K.

In order to remove the diborane from the storage container 9, the valves V3 and V7 are first closed and the valves V4 and V9 are opened. Gaseous nitrogen flows from the headspace 26 of the nitrogen tank 19 into the container 11. In order to achieve a temperature above 180.65 K required for the vaporization of the diborane in the storage container 9, the nitrogen in the gas line 25 is heated by means of the heating equipment 29. It is also possible that the heating equipment 29 is also arranged in the container 11, or else directly in the storage container 9. The temperature of the diborane in the storage container 9 increases, and the diborane vaporizes and is supplied by way of the dispensing line 14 to a dispensing system not shown here. As soon as a prescribed quantity of diborane has been drawn off in this way from the storage container 9, the valves V4 and V9 are closed and the valves V3 and V7 are opened, so that the storage container 9 is again available to receive diborane from the condenser 2. After the reopening of the valve V3, liquid diborane which has accumulated in the transfer line 4 during the removal procedure flows into the storage container 9. The removal of the diborane from the storage container 9 is therefore achieved, and additionally without any requirement that the procedure for separating the gas mixture in the device 1 is interrupted for that purpose.

As mentioned, because of the low temperature in the freezer 5 a frozen layer consisting of diborane forms over the course of time on the surface of the heat-exchanger area 16 in the freezer 5. In order to thaw said layer, the valves V1, V2 and V6 are closed and the valve V8 is opened, so that gaseous nitrogen and optionally nitrogen heated by means of heating equipment 31 with a temperature of, for example, 150 K flows through the heat-exchanger area 16. The temperature of the heat-exchanger area 16 thus increases to a temperature above the melting point of diborane. The frozen material located on the heat-exchanger area 16 therefore thaws, drips into the transfer line 4 and flows by way of the liquid discharge line 8 into the storage container 9. After conclusion of the thawing procedure, the valve 8 is again closed and the valves V1, V2 and V6 are opened, whereupon the device 1 is again available for the separation of the hydrogen-diborane gas mixture. Because the by far greatest portion of the diborane originally present in the gas mixture has already been separated in the condenser 2, thawing of the freezer 5 is required only at relatively long intervals of some days or weeks (during otherwise continuous operation of the device 1). After thawing, V6 is opened and V8 is closed. Because relatively cold gas has been used for the prior thawing procedure, cold running is resumed very rapidly and with only a small requirement for liquid nitrogen.

The thawing procedure can also take place during continuous operation if a very slightly higher level of diborane emission is acceptable for a short time. For this, V6 is closed and V8 is opened, with no interruption of the supply of the gas mixture to V1. In this case, thawing can be achieved by slight warming of the gas mixture in the transfer line 4 by means of the heating equipment 30 as an alternative instead of the supply of nitrogen gas by way of the supply line 27, or in support thereof. The device 1 thus achieves, in a continuous operation, an efficient separation of a gas mixture consisting of diborane and hydrogen.

In an embodiment of the invention not shown here, the design of the device 1 can also use a further freezer which is in essence constructed to be the same as the freezer 5 and which is connected to the transfer line 4 in alternation with the freezer 5, during thawing of the respective other freezer. This permits further increase of the diborane reclamation rate and avoids excessively high diborane emissions during thawing.

In an embodiment of the invention likewise not shown here, the suction pump 7 is a fluid-jet pump, the injection side of which is connected to the gas discharge line 21 or to the coolant discharge line 13. The pressure of the nitrogen present there, for example about 13 bar, is sufficient to generate the reduced pressure required for the evacuation of the hydrogen from the freezer 5.

LIST OF REFERENCE NUMERALS

1 Device
2 Condenser
3 Supply line (for diborane-hydrogen mixture)
4 Transfer line
5 Freezer
6 Gas discharge line
7 Suction pump
8 Liquid discharge line
9 Storage container
10 —
11 Container (for a coolant bath)
12 Coolant supply line
13 Coolant discharge line
14 Dispensing line
15 Heat-exchanger area
16 Heat-exchanger area
17 Coolant supply line
18 Coolant supply line
19 Nitrogen tank
20 —
21 Gas discharge line
22 Gas discharge line
23 Gas outlet
24 Pressure-maintaining valve
25 Gas line
26 Headspace
27 Gas line
28 Pressure-maintaining valve
29 Heating equipment
30 Heating equipment
31 Heating equipment
V1-V9 Valves

The invention claimed is:

1. A method for the separation of diborane from a diborane-hydrogen mixture, the method comprising:
supplying a gas mixture comprising diborane and hydrogen to a first heat exchanger in which the gas mixture comes into thermal contact with a liquefied gas;
maintaining the liquefied gas in the first heat exchanger at a first pressure at which a temperature of the liquefied gas is below a boiling point of diborane and above a freezing point of diborane such that the diborane at least to some extent condenses into liquefied diborane on heat-exchanger areas of the first heat exchanger and does not freeze;
discharging the liquefied diborane from the first heat exchanger to a storage container;
supplying the gas mixture that has passed through the first heat exchanger to a second heat exchanger in which the gas mixture comes into thermal contact with the liquefied gas;
providing the liquefied gas in the second heat exchanger at a second pressure, the second pressure being lower than the first pressure and being a pressure at which a temperature of the liquefied gas is below the freezing point of diborane such that diborane still present in the gas mixture freezes on heat-exchanger areas of the second heat exchanger; and
supplying the liquefied gas from one coolant tank to both the first and second heat exchangers, wherein an operating pressure in the coolant tank is at least the first pressure;
wherein supplying the liquefied gas from the coolant tank to the first heat exchanger comprises controlling a pressure-maintaining valve in a gas discharge line downstream of the first heat exchanger so as to maintain the liquefied gas in the first heat exchanger at the first pressure; and
wherein supplying the liquefied gas from the coolant tank to the second heat exchanger comprises controlling a pressure-reducing valve in a coolant supply line upstream of the second heat exchanger so as to provide the liquefied gas to the second heat exchanger at the second pressure.

2. The method as claimed in claim 1, wherein the diborane in the storage container is maintained at a temperature at which it remains in the liquid state or freezes.

3. The method as claimed in claim 2, wherein a liquefied gas is used as coolant for the cooling of the diborane in the storage container and is maintained at a pressure such that the temperature in the storage container is above the freezing point but below the boiling point of the diborane.

4. The method as claimed in claim 3, wherein the gas mixture is heated after passage through the first heat exchanger and before entry into the second heat exchanger.

5. The method as claimed in claim 1, wherein the liquefied gas in the coolant tank is supplied to the first heat exchanger via a coolant supply line upstream of the first heat exchanger and to the second heat exchanger via the coolant supply line upstream of the second heat exchanger, wherein the coolant supply lines branch from each other such that the coolant supply lines are in a parallel fluid circuit configuration.

6. A device for the separation of diborane from a diborane-hydrogen mixture, the device comprising:
 a first heat exchanger comprising:
  a gas mixture supply line and a gas mixture discharge line for a gas mixture comprising diborane and hydrogen;
  a coolant supply line for a liquefied gas used as coolant;
  a gas discharge line for discharging coolant vaporized during thermal contact with the gas mixture at heat-exchanger areas of the first heat exchanger; and
  a diborane discharge line for discharging diborane liquefied during heat exchange with the coolant;
 a storage container flow-connected to the diborane discharge line, the storage container being configured to store the liquefied diborane;
 a second heat exchanger comprising:
  a gas mixture supply line and a gas mixture discharge line for the gas mixture, wherein the gas mixture discharge line of the first heat exchanger is flow-connected to the gas mixture supply line of the second heat exchanger;
  a coolant supply line for the liquefied gas used as coolant;
  a gas discharge line for discharging coolant vaporized during thermal contact with the gas mixture at heat-exchanger areas of the second heat exchanger; and
  a diborane discharge line for discharging diborane liquefied during heat exchange with the coolant, the diborane discharge line being flow-connected to the storage container;
 a pressure-maintaining valve located in the gas discharge line of the first heat exchanger and being controlled so as to maintain the liquefied gas in the first heat exchanger at a first pressure at which a temperature of the liquefied gas is below a boiling point of diborane and above a freezing point of diborane;
 a pressure-reducing valve located in the coolant supply line of the second heat exchanger and being controlled so as to provide the liquefied gas to the second heat exchanger at a second pressure at which a temperature of the liquefied gas is below the freezing point of diborane; and
 a tank holding the liquefied gas to be used as the coolant in the first heat exchanger and the second heat exchanger, the tank being flow connected to the coolant supply lines of both the first and second heat exchangers, wherein an operating pressure of the tank is at least the first pressure.

7. The device as claimed in claim 6, wherein there is heating equipment arranged in the gas mixture supply line for the gas mixture of the second heat exchanger.

8. The device as claimed in claim 6, wherein the storage container is equipped with cooling equipment for controlling the temperature of the liquefied diborane in the storage container.

9. The device as claimed in claim 6, wherein the storage container is equipped with a dispensing line and has operative connection to heating equipment.

10. The device as claimed in claim 6, wherein the gas mixture discharge line for the gas mixture from the first heat exchanger and/or from the second heat exchanger is equipped with a fluid-jet pump which is flow-connected on the injection side to the gas discharge line of the first heat exchanger.

11. The device as claimed in claim 6, wherein the coolant supply line of the first heat exchanger and the coolant supply line of the second heat exchanger branch off from each other such that the coolant supply line of the first heat exchanger and the coolant supply line of the second heat exchanger are in a parallel fluid circuit configuration.

* * * * *

UNITED STATES PATENT AND TRADEMARK OFFICE
CERTIFICATE OF CORRECTION

PATENT NO. : 12,240,759 B2
APPLICATION NO. : 17/434929
DATED : March 4, 2025
INVENTOR(S) : Friedhelm Herzog et al.

Page 1 of 1

It is certified that error appears in the above-identified patent and that said Letters Patent is hereby corrected as shown below:

In the Claims

Claim 4, Column 10, Line 60, delete "claim 3" and substitute therefor -- claim 1 --.

Signed and Sealed this
Fifteenth Day of April, 2025

Coke Morgan Stewart
*Acting Director of the United States Patent and Trademark Office*